3,436,308
PROCESS FOR PRODUCING L-GLUTAMIC ACID
Yuichi Noguchi, Tetsuo Uno, Yoshita Kubota, and Hiroshi Hosoda, Hofu-shi, Japan, assignors to Kyowa Hakko Kogyo Co., Ltd., Tokyo, Japan, a corporation of Japan
No Drawing. Filed Apr. 22, 1965, Ser. No. 450,168
Claims priority, application Japan, Apr. 22, 1964, 39/22,387; June 27, 1964, 39/36,271
Int. Cl. C12d 13/06
U.S. Cl. 195—29                    13 Claims

ABSTRACT OF THE DISCLOSURE

The present disclosure is directed to a process of producing L-glutamic acid in high yields which comprises culturing any microorganism capable of producing L-glutamic acid in an aqueous nutrient medium under aerobic conditions in the presence of one or more esters of a monohydric alcohol having about three to ten carbon atoms and a lower saturated carboxylic acid, including alkyl-substituted derivatives of said acid, in an amount sufficient to increase the yield of L-glutamic acid produced. Advantageously, the ester is employed in an amount of about 0.01 to 1.0 percent by weight.

---

This invention relates to a process for producing L-glutamic acid. More particularly, it relates to a process for the production of L-glutamic acid by fermentation. Even more particularly, the invention relates to a process for the production of L-glutamic acid by fermentation with microorganisms in the presence of organic acid esters or the derivatives thereof.

Recently, methods of producing L-glutamic acid by fermentation have been greatly developed. Moreover, their application to an industrial scale has been enlarged because of a great increase in the consumption and use of L-glutamic acid. However, there are yet many unknown factors which influence the production of L-glutamic acid by fermentation at the present time. Hence, many problems still exist with respect to fermentation conditions in such processes. The study and application of these factors thus is of great importance in determining optimum processes for the production of L-glutamic acid in high yield on an industrial scale.

It is known in the art that it is necessary, for the purpose of cultivating L-glutamic acid-producing microorganisms in order to obtain L-glutamic acid by fermentation methods, to provide essential and specific nutrients for the growth of the microorganisms such as vitamins, amino acids, etc. in small amounts or to add the raw material of fermentation containing such substances to a culture medium which contains a carbon source, a nitrogen source, inorganic compounds and the like. Furthermore, it is known that such additions may increase the production yield of L-glutamic acid by fermentation. It has been specifically reported (Japanese patent publication S-38-25288) that sorbitan mono-oleate, polyethylene sorbitan mono-oleate and the like are effective as additives in such processes, in addition to the above-mentioned substances.

One of the objects of the present invention is to provide an improved process for the preparation of L-glutamic acid which overcomes the disadvantages and deficiencies of the prior art methods.

Another object of the present invention is to provide a process for producing L-glutamic acid by fermentation which may be carried out in an efficacious and simple manner.

A further object of the invention is to provide a process for preparing L-glutamic acid by fermentation which gives the product in high purity and good yield.

A still further object of the invention is to provide a process for producing L-glutamic acid by fermentation which may be carried out advantageously on an industrial scale to give a high yield of product.

These and other objects of the present invention will become apparent to those skilled in the art from a reading of the following specification and claims.

In searching for various factors related to fermentation processes involving microorganisms to give L-glutamic acid, the present inventors found that a remarkable amount of L-glutamic acid is accumulated in the culture medium if a citric acid ester or a derivative thereof is added to a culture medium containing the essential nutrients for the growth of the microorganism such as a carbon source, a nitrogen source, inorganic compounds and the like. Furthermore, as a result of many studies on various other organic acid esters, it has been further found that all sorts of organic acid esters, the derivatives thereof or mixtures thereof greatly increase the yield of production of L-glutamic acid by fermentation.

Hence, in accordance with the present invention, it has been found that an efficacious fermentation method for producing L-glutamic acid is effected by conducting the culture in a culture medium containing, besides the conventional nutrients, organic acid esters, the derivatives thereof or mixtures of the same.

As organic acid esters effective in the process of the present invention, there may be mentioned, by way of example, mono-, di- and triesters of propyl citrate, isopropyl citrate, butyl citrate, isobutyl citrate, amyl citrate, isoamyl citrate, benzyl citrate, hexyl citrate, heptyl citrate, octyl citrate, nonyl citrate, decyl citrate, etc., mono and diesters of succinic acid such as propyl succinate, isopropyl succinate, butyl succinate, isobutyl succinate, amyl succinate, isoamyl succinate, benzyl succinate, hexyl succinate, heptyl succinate, octyl succinate, nonyl succinate, decyl succinate, etc., malic acid esters, malonic acid esters, adipic acid esters, gluconic acid esters and the like, and mixtures of two or more of these. Furthermore, derivatives of saturated fatty acid esters, especially alkyl-substituted saturated fatty acid esters such as acetylmalic acid esters and the like, are effective in the process of the present invention.

In order to demonstrate the effectiveness of adding various kinds of organic acid esters in varying amounts to a culture medium in accordance with the present invention, the following experiments showing the production of L-glutamic acid by fermentation with the use of *Micrococcus glutamicus* are given as illustrative. Unless otherwise noted, the percentages given are by weight.

EXPERIMENT 1

This experiment demonstrates the relationship between the type of alkyl radical which may be substituted on a succinic acid ester in accordance with the process of the present invention, the amounts thereof to be added to a culture medium, and the effects thereof.

The fermenter used in all the fermentation tests is a 5-liter jar.

270 ml. of seed liquor of an L-glutamic acid-producing bacterium of the type *Micrococcus glutamicus* ATCC No. 13032 is inoculated into 2730 ml. of a culture medium containing 13% of starch hydrolyzate with acid (as glucose), 0.1% of ammonium hydrogen phosphate, 0.1% of diammonium hydrogen phosphate, 0.05% of magnesium sulfate, 0.004% of manganese sulfate, 0.002% of ferrous sulfate, 0.3% of potassium sulfate, 0.5% of urea and 3 micrograms per liter of biotin. The thusly inoculated medium is incubated for 48 hours under the following conditions:

Revolution speed _____ r.p.m__ 600
Temperature _____ ° C__ 34
Ventilation rate _____ liters/min__ 3

During the incubation, the pH is adjusted to 7.0 with a 30% aqueous urea solution.
The experimental results are as follows:

| | Amount of ester added (percent) | Amount of L-glutamic produced (mg./ml.) |
|---|---|---|
| 1. Di-n-butyl succinate | 0.10 | 63.3 |
| do | 0.15 | 65.0 |
| do | 0.20 | 68.1 |
| No addition | | 55.5 |
| 2. Di-n-octyl succinate | 0.10 | 60.0 |
| do | 0.15 | 65.3 |
| do | 0.20 | 66.0 |
| No addition | | 55.6 |
| 3. Di-n-hexyl succinate | 0.10 | 68.1 |
| do | 0.15 | 66.6 |
| do | 0.20 | 58.8 |
| No addition | | 55.2 |

EXPERIMENT 2

This experiment indicates the effect of the type of organic acid contained in the organic acid esters added to culture media in accordance with the present invention.

The fermentation tests are conducted the same as in Experiment 1. The experimental results are as follows:

| | Amount of ester added (percent) | Amount of L-glutamic produced (mg./ml.) |
|---|---|---|
| Di-n-propyl succinate | 0.1 | 61.2 |
| | 0.2 | 67.0 |
| Di-n-propyl malate | 0.1 | 60.4 |
| | 0.2 | 64.4 |
| Di-n-propyl malonate | 0.1 | 63.1 |
| | 0.2 | 66.9 |
| N-propyl adipate | 0.1 | 62.0 |
| | 0.2 | 66.8 |
| N-propyl gluconate | 0.1 | 64.0 |
| | 0.2 | 67.1 |
| No addition | | 55.5 |

EXPERIMENT 3

The fermentation tests are conducted in a 5-liter jar fermenter.

270 ml. of seed liquor of an L-glutamic acid-producing bacterium of the type *Micrococcus glutamicus* ATCC No. 13032 is inoculated into 2,730 ml. of a culture medium containing 13% of starch hydrolyzate with acid (as glucose), 0.1% of ammonium hydrogen phosphate, 0.1% of diammonium hydrogen phosphate, 0.05% of magnesium sulphate, 0.004% of manganese sulfate, 0.002% of ferrous sulfate, 0.3% of potassium sulfate, 0.5% of urea and 3 micrograms per liter of biotin. The medium is incubated for 48 hours under the following conditions:

Revolution speed _____ r.p.m__ 600
Temperature _____ ° C__ 34
Ventilation rate _____ liters/min__ 3

During the incubation, the pH is adjusted to 7.0 with a 30% aqueous urea solution.
The experimental results are as follows:

| | Amount of ester added (percent) | Amount of L-glutamic produced (mg./ml.) |
|---|---|---|
| 1. Tri-n-butyl citrate | 0.05 | 68.2 |
| do | 0.10 | 70.9 |
| do | 0.15 | 71.4 |
| do | 0.20 | 70.0 |
| No addition | | 56.0 |
| 2. Di-n-butyl citrate | 0.05 | 57.6 |
| do | 0.10 | 60.0 |
| do | 0.15 | 63.5 |
| do | 0.20 | 63.0 |
| No addition | | 55.0 |
| 3. Mono-n-butyl citrate | 0.05 | 61.8 |
| do | 0.10 | 62.1 |
| do | 0.15 | 65.0 |
| do | 0.20 | 65.2 |
| No addition | | 55.6 |
| 4. Tri-n-amyl citrate | 0.05 | 56.9 |
| do | 0.10 | 58.9 |
| do | 0.15 | 62.2 |
| do | 0.20 | 64.3 |
| No addition | | 54.8 |

| | Amount of ester added (percent) | Amount of L-glutamic produced (mg./ml.) |
|---|---|---|
| 5. Tri-n-hexyl citrate | 0.05 | 57.8 |
| do | 0.10 | 67.3 |
| do | 0.15 | 66.4 |
| do | 0.20 | 56.9 |
| No addition | | 55.0 |

As shown by Experiments 1, 2 and 3, the amount of L-glutamic acid produced is strikingly increased in all cases where the fermentation is conducted in the presence of an organic acid ester or derivative thereof in accordance with the present invention.

Suitable amounts of organic acid esters or their derivatives to be added to the fermentation medium vary approximately from 0.01 to 1.0% by weight, although this varies somewhat with the species of L-glutamic acid-producing bacterium employed, the composition of the culture medium, and the sugar concentration and especially with the kind of organic acid ester additive utilized. However, it is needless to say and should be obvious to one skilled in the art that the addition of optimum amounts of organic acid esters or their derivatives is necessary for a most effective fermentation production of L-glutamic acid once the various culture conditions to be employed have been decided upon.

The bacteriological properties of microorganisms belonging to *Micrococcus glutamicus* employed in the above experiments are described in Japanese Patent No. 243,382. When this microorganism was first separated, this name was given to it because it is a microorganism that belongs to the genus Micrococcus, according to the description given in the 5th and 6th edition of Bergey's Manual of Determinative Bacteriology. Since that time, as the result of the separation of amino acid-producing bacteria by one-step methods, microorganisms belonging to the genera Brevibacterium, Aerobacter, Microbacterium, etc., have been reported as the names of such microorganisms in various references in the art. However, there are no fundamental differences in the bacteriological properties between the latter-mentioned microorganisms and that belonging to *Micrococcus glutamicus*. The only real differences between these genera are those merely resulting in subjective differences between different researcher's viewpoints on the characteristics studied. Therefore, these micro-organisms are all recognized as belonging to *Micrococcus glutamicus* and as being similar bacteria. Accordingly, microorganisms which belong to *Micrococcus glutamicus* should be classified according to the bacteriological properties of microorganisms which are adapted to produce L-glutamic acid without a sole dependence only upon species and genus. In this case, although the species and genus of the said microorganisms are reported as being different, they should be regarded as identical or analogous to microorganisms belonging to *Micrococcus glutamicus*.

The process of the present invention is not restricted to the specific type of microorganisms employed in the examples, but may be applied to all L-glutamic acid-producing bacteria. Thus, besides the above-mentioned bacteria, L-glutamic acid-producing bacteria which belong to any of the genera Bacillus, Corynebacterium, Escherichia, Pseudomonas, Aspergillus, Saccharomyces, etc., are all effective in the process of the present invention.

As for the composition of the culture medium, either a synthesized culture medium or an organic culture medium is suitable as long as it contains the essential nutrients for the growth of the microorganisms employed. Such nutrients are well known in the art and include substances such as a carbon source, a nitrogen source, inorganic compounds and the like which are utilized by the bacterium employed in appropriate amounts. Thus, as a carbon source, there may be mentioned, by way of example, glucose, fructose, mannose, galactose, sucrose, maltose, lactose, trehalose, cellobiose, raffinose, arabitol, mannitol, sorbitol, inositol, xylose, arabinose, starch hydrolysate solution, beet molasses, blackstrap molasses and the like. These substances may be used either singly or in mixtures of two or more. As a nitrogen source, various kinds of inorganic or organic salts or compounds such as ammonia, ammonium sulfate, ammonium chloride, ammonium nitrate, ammonium carbonate, ammonium acetate, etc., nitrates, urea, or other compounds containing nitrogen, such as peptone, N-Z-Amine (trademark for a series of casein hydrolysates), meat extract, yeast extract, cornsteep liquor, distillers dried solubles, casein hydrolysate, fish meal, soybean oil meal, pupa, fermentation dregs and the like may be employed. Again, these substances are utilizable either singly or in combination of two or more. Furthermore, it is necessary to add to the culture medium essential nutrients for the growth of the bacteria such as amino acids, e.g., aspartic acid, glutamic acid, threonine, methionine, etc., and/or vitamins, e.g., biotin, thiamine, cobalamin, etc. Inorganic compounds which may be added to the culture medium include potassium dihydrogen phosphate, potassium monohydrogen phosphate, magnesium sulfate, calcium carbonate, manganese sulfate, etc.

The following examples are given merely as illustrative of the present invention and are not to be considered as limiting. Unless otherwise noted, the percentages therein are by weight.

It should be noted that the remarkable results effected by the present invention and illustrated by the examples may also be attained with the use of mixtures of two or more of the organic acid esters or their derivatives.

Example 1

2,730 ml. of a culture medium containing 12% of glucose, 0.1% of ammonium hydrogen phosphate, 0.1% of diammonium hydrogen phosphate, 0.05% of magnesium sulfate, 0.004% of manganese sulfate, 0.002% of ferrous sulfate, 0.3% of potassium sulfate, 0.5% of urea, 5.5 micrograms per liter of biotin, 0.1% of casamino acid, 10 micrograms per liter of thiamine and 0.1% of diisobutyl succinate is placed into a 5 liter jar fermenter and sterilized under pressure. Then, 270 ml. of seed liquor of *Micrococcus glutamicus* ATCC No. 13032, which has been cultured for 12 hours with shaking in a culture medium containing 5% of glucose, 1% of peptone, 0.5% of meat extract, 0.5% of ammonium sulfate, 0.05% of potassium hydrogen phosphate, 0.05% of dipotassium hydrogen phosphate, 0.025% of magnesium sulfate, 0.001% of manganese sulfate, 0.001% of ferrous sulfate, 0.5% of urea and 10 micrograms per liter of biotin, is inoculated into the fermentation jar. The fermentation medium is then incubated for 48 hours under the following conditions: temperature, 34° C.; speed of rotation, 600 r.p.m.; ventilation rate, 3 liters/min. The pH of the fermentation liquor is adjusted to 7.0 with a 30% aqueous urea solution.

After the completion of the fermentation, the amount of L-glutamic acid contained in the fermentation liquor is 55.5 mg./ml. and the yield of sugar is 49.0% (only 44.9 mg./ml. of L-glutamic acid and a 39.7% yield of sugar are obtained if diisobutyl succinate is not added to the medium employed in this example).

44.0 grams of crude crystals of L-glutamic acid is recovered by concentrating 1 liter of the fermentation liquor under reduced pressure, removing the cells of bacteria after a hydrochloric acid treatment and crystallizing at a pH of 3.2 with hydrochloric acid.

Example 2

2,730 ml. of a culture medium which contains sweet potato starch hydrolyzate with hydrochloric acid (containing 13.5% of direct reducing sugar), 0.1% of ammonium hydrogen phosphate, 0.1% of diammonium hydrogen phosphate, 0.05% of magnesium sulfate, 0.004% of manganese sulfate, 0.3% of potassium sulfate, 10 micrograms per liter of biotin and 0.2% of diisoamyl succinate is placed into a 5 liter jar fermenter and sterilized under pressure.

270 ml. of seed liquor of *Micrococcus glutamicus* ATCC No. 13032 is inoculated thereinto. The thusly inoculated fermentation medium is cultured for 48 hours under the following conditions: temperature, 34° C.; speed of rotation, 550 r.p.m.; ventilation rate, 3 liters/min. The pH of the fermentation liquor is adjusted to 7.0 with a 15% aqueous ammonia solution. After 10 hours, penicillin G potassium in the amount of 5 units per milliliter is added to the culture.

The amount of L-glutamic acid in the fermentation liquor at the completion of fermentation is 64.5 mg./ml., and the yield of sugar is 47.2%. (Only 52.5 mg./ml. of L-glutamic acid and a 38.4% yield of sugar are obtained if diisoamyl succinate is not added to the culture medium and the same example is carried out in the absence thereof.)

57.2 grams of crude crystals of L-glutamic acid is obtained by concentrating 1 liter of the fermentation liquor under reduced pressure, removing the cells of bacteria after a hydrochloric acid treatment and crystallizing at a pH of 3.2 with hydrochloric acid.

Example 3

Similarly to Example 1, a cultivation is carried out except that wheat starch hydrolyzate with acid (which contains 12.1% of direct reducing sugar) is employed. The organic acid ester utilized is 0.1% of di-n-hexyl succinate. The culture is contained for 40 hours.

The amount of L-glutamic acid in the fermentation liquor at the completion of fermentation is 58.2 mg./ml. and the yield of sugar is 45.7%. (Only 49.8 mg./ml. of L-glutamic acid and a 39.1% yield of sugar are obtained if di-n-hexyl succinate is not added to the medium.)

53.4 grams of crude crystals of L-glutamic acid is obtained by concentrating 1 liter of the said fermentation liquor under reduced pressure, removing the cells of bacteria after a hydrochloric acid treatment and crystallizing at a pH of 3.2 with hydrochloric acid.

Example 4

The same fermentation as that described in Example 1 is carried out except that 0.2% of di-n-butyl malate instead of n-butyl succinate is added as the organic acid ester.

At the completion of the fermentation, there is produced 69.0 mg./ml. of L-glutamic acid in the fermentation liquor. A 46.0% yield of sugar is obtained. (Only 58.5 mg./ml. of L-glutamic acid and a 39.0% yield of sugar are obtained without the addition of di-n-butyl malate.)

56.5 grams of crude crystals of L-glutamic acid is recovered by concentrating one liter of the said fermentation liquor, removing the cells of bacteria after a hydrochloric acid treatment and crystallizing at a pH of 3.2 with hydrochloric acid.

Example 5

The same fermentation as that described in Example 1 is carried out by using 0.1% of di-n-butyl malonate in lieu of di-n-butyl succinate.

After the completion of fermentation, the amount of L-glutamic acid in the fermentation liquor is 65.5 mg./ml. and the yield of sugar is 46.8%. (On the other hand, only 57.5 mg./ml. of L-glutamic acid and a 41.1% yield of sugar are obtained when di-n-butyl malonate is not employed as an additive.)

54.0 grams of crude crystals of L-glutamic acid is recovered by concentrating one liter of the said fermentation liquor, removing the cells of bacteria after a hydrochloric acid treatment and crystallizing at a pH of 3.2 with hydrochloric acid.

Example 6

The same fermentation as that described in Example 2 is carried out but with the use of 0.1% of n-butyl adipate in lieu of diisoamyl succinate.

At the completion of fermentation, the amount of L-glutamic acid produced in the fermentation liquor is 62.0 mg./ml. and the yield of sugar is 41.3%. (On the other hand, only 58.0 mg./ml. of L-glutamic acid and a 38.7% yield of sugar is obtained without the addition of n-butyl adipate.)

52.5 grams of crude crystals of L-glutamic acid is recovered by concentrating one liter of the said fermentation liquor under reduced pressure, removing the cells of bacteria after a hydrochloric acid treatment and crystallizing at a pH of 3.2 with hydrochloric acid.

Example 7

The same fermentation as that described in Example 2 is conducted but with the use of 0.2% of n-butyl gluconate instead of diisoamyl succinate.

At the completion of fermentation, the amount of L-glutamic acid in the fermentation liquor is 64.5 mg./ml. and the yield of sugar is 43.0%. (Only 57.2 mg./ml. of L-glutamic acid and a 38.1% of sugar are obtained in n-butyl gluconate is not added to the medium.)

53.3 grams of crude crystals of L-glutamic acid is recovered by concentrating 1 liter of the said fermentation liquor, removing the cells of bacteria after a hydrochloric acid treatment and recrystallizing at a pH of 3.2 with hydrochloric acid.

Example 8

2,730 ml. of a culture medium containing 12% of glucose, 0.1% of ammonium hydrogen phosphate, 0.1% of diammonium hydrogen phosphate, 0.05% of magnesium sulfate, 0.004% of manganese sulfate, 0.002% of ferrous sulfate, 0.3% of potassium sulfate, 0.5% of urea, 5.5 micrograms per liter of biotin, 10 micrograms per liter of thiamine and 0.1% of tri-n-amyl citrate is added to a 5 liter jar fermenter and sterilized under pressure. Inoculated thereinto is 270 ml. of seed liquor of *Micrococcus glutamicus* ATCC No. 13032 which has been cultured for 12 hours with shaking in a culture medium containing 5% of glucose, 1% of peptone, 0.5% of meat extract, 0.5% of ammonium sulfate, 0.05% of potassium hydrogen phosphate, 0.05% of dipotassium hydrogen phosphate, 0.025% of magnesium sulfate, 0.001% of manganese sulfate, 0.001% of ferrous sulfate, 0.5% of urea and 10 micrograms per liter of biotin. The thusly inoculated medium is incubated for 48 hours under the following conditions: temperature, 34° C.; speed of rotation, 600 r.p.m.; ventilation rate of air, 3 liters/min. The pH of the fermentation liquor is adjusted to 7.0 with a 30% urea solution.

At the completion of fermentation, the amount of L-glutamic acid contained in the fermentation liquor is 60.4 mg./ml. and the residual sugar is 0.8%. (Only 48.2 mg./ml. of L-glutamic acid is produced while a residual sugar content of 0.7% is obtained if tri-n-amyl citrate is not added to the medium.)

55.0 grams of crude crystals of L-glutamic acid is recovered by concentrating 1 liter of the said fermentation liquor, removing the cells of bacteria after a hydrochloric acid treatment and crystallizing at a pH of 3.2 with hydrochloric acid.

Example 9

2,730 ml. of a culture medium containing sweet potato starch hydrolyzate with acid (which contains 13.5% of direct reducing sugar), 0.1% of ammonium hydrogen phosphate, 0.1% of diammonium hydrogen phosphate, 0.05% of magnesium sulfate, 0.004% of manganese sulfate, 0.3% of potassium sulfate, 10 micrograms per liter of biotin, and 0.2% of tri-n-butyl acetyl citrate is added to a 5 liter jar fermenter and sterilized under pressure. 270 ml. of seed liquor of *Micrococcus glutamicus* ATCC No. 13032 is inoculated into the medium. The medium is then incubated for 48 hours under the following conditions: temperature, 34° C.; rate of rotation, 550 r.p.m.; ventilation rate, 3 liters/min. The pH of the fermentation liquor is adjusted to 7.0 with a 15% aqueous ammonia solution. After 10 hours, 5 units/ml. of penicillin G potassium is added to the culture.

At the completion of fermentation, there is produced in the fermentation liquor 68.7 mg./ml. of glutamic acid. The residual sugar is 0.6% of direct reducing sugar. (Only 51.2 mg./ml. of L-glutamic acid and 1.1% of residual sugar are obtained if tri-n-butyl acetyl citrate is not added to the medium.)

58.0 grams of crude crystals of L-glutamic acid is recovered by concentrating 1 liter of the said fermentation liquor under reduced pressure, removing the cells of bacteria after a hydrochloric acid treatment and crystallizing at a pH of 3.2 with hydrochloric acid.

Example 10

2,730 ml. of a culture medium similar to that of Example 2 but wherein wheat starch hydrolyzate with acid (which contains 12.1% of direct reducing sugar) and 0.15% of tri-n-hexyl citrate is put into a 5 liter jar fermenter and sterilized under pressure. The cultivation is carried out for 40 hours in the same manner as described in Example 9.

At the end of fermentation, the amount of L-glutamic acid in the fermentation liquor is 59.8 mg./ml. and the residual sugar is 0.4%. (Only 50.2 mg./ml. of L-glutamic acid is produced while 0.7% of residual sugar is obtained without the addition of tri-n-hexyl citrate to the medium.)

53.1 grams of crude crystals of L-glutamic acid is obtained by concentrating 1 liter of the fermentation liquor under reduced pressure, removing the cells of bacteria after a hydrochloric acid treatment and crystallizing at a pH of 3.2 with hydrochloric acid.

Example 11

300 ml. of the same culture medium as that of Example 9 but wherein cornstarch hydrolyzate with acid (which contains 12.7% of direct reducing sugar) and 0.10% of octyl citrate is added to the medium is placed into a 5 liter jar fermenter and sterilized under pressure. The cultivation is carried out as described in Example 2 for 42 hours.

The amount of L-glutamic acid in the fermentation liquor at the end of fermentation is 59.3 mg./ml. and the residual sugar is 0.9%. (Only 49.1 mg./ml. of L-glutamic acid and 1% residual sugar are obtained if tri-n-octyl citrate is not added to the medium.)

53.7 grams of crude crystals of L-glutamic acid is obtained by concentrating 1 liter of the said fermentation liquor under reduced pressure, removing the cells of bacteria after a hydrochloric acid treatment and crystallizing at a pH 3.2 with hydrochloric acid.

Example 12

The fermentation is conducted in the same manner as described in Example 8 but with the addition of 0.15% of di-n-propyl citrate. The amount of L-glutamic acid contained in the fermentation liquor at the end of fermentation is 59.5 mg./ml. and the residual sugar content is 0.8%. (Only 49.0 mg./ml. of L-glutamic acid and a residual sugar content of 0.7% are obtained if di-n-propyl citrate is not added.)

Example 13

The same fermentation as that described in Example 8 but wherein 0.10% of mono-n-octyl citrate is employed as the organic acid ester additive is carried out. The amount of L-glutamic acid in the fermentation liquor at the end of fermentation is 60.8 mg./ml. and the residual sugar content is 0.7%. (Only 48.5 mg./ml. of glutamic acid is produced and 0.7% of residual sugar obtained if mono-n-octyl citrate is not added to the medium.)

A process according to this invention may be effected, wherein the culture is carried out at between 20°–40° C., while maintaining the pH value of the culturing medium within the range of 5 to 9.

The invention being thus described, it will be obvious that the same may be varied in many ways. Such variations are not to be regarded as a departure from the spirit and scope of the invention and all such modifications are intended to be included within the scope of the following claims.

What is claimed is:

1. In a fermentation process for the production of L-glutamic acid, the improvement which comprises conducting the fermentation in the presence of at least one ester of a monohydric aliphatic alcohol having about three to ten carbon atoms and a lower saturated carboxylic acid selected from the group consisting of citric acid, succinic acid, malic acid, malonic acid, adipic acid, gluconic acid, acetyl citric acid and acetyl maleic acid in an amount sufficient to increase the yield of L-glutamic acid produced.

2. The process of claim 1, wherein said ester is employed in amounts of from approximately 0.01 to 1.0% by weight.

3. A process for producing L-glutamic acid which comprises culturing a microorganism capable of producing L-glutamic acid in an aqueous nutrient medium under aerobic conditions in the presence of at least one ester of a monohydric aliphatic alcohol having about three to ten carbon atoms and a lower saturated carboxylic acid selected from the group consisting of citric acid, succinic acid, malic acid, malonic acid, adipic acid, gluconic acid, acetyl citric acid and acetyl maleic acid in an amount sufficient to increase the yield of L-glutamic acid produced.

4. The process of claim 3, wherein said ester is employed in amounts of from approximately 0.01 to 1.0% by weight.

5. The process of claim 3, wherein said aqueous nutrient medium contains a source of carbon and nitrogen.

6. A process for producing L-glutamic acid which comprises culturing the microorganism *Micrococcus glutamicus* in an aqueous nitrient medium under aerobic conditions in the presence of at least one ester of a monohydric aliphatic alcohol having about three to ten carbon atoms and a lower saturated carboxylic acid selected from the group consisting of citric acid, succinic acid, malic acid, malonic acid, adipic acid, gluconic acid, acetyl citric acid and acetyl maleic acid in an amount suffiient to increase the yield of L-glutamic acid produced.

7. The process of claim 6, wherein said ester is employed in amounts of from approximately 0.01 to 1.0% by weight.

8. The process of claim 6, wherein said aqueous nutrient medium contains a source of carbon and nitrogen.

9. A process for producing L-glutamic acid which comprises culturing the microorganism *Micrococcus glutamicus* in an aqueous nutrient medium containing a source of carbon and nitrogen under aerobic conditions in the presence of approximately 0.01 to 1.0% by weight of an ester of a monohydric, aliphatic alcohol having about three to ten carbon atoms and a lower saturated carboxylic acid selected from the group consisting of citric acid, succinic acid, malic acid, malonic acid, adipic aid, gluconic acid, acetyl citric acid and acetyl maleic acid.

10. The process of claim 6, wherein said microorganism is *Micrococcus glutamicus* ATCC No. 13032.

11. The process of claim 9, wherein said microorganism is *Micrococcus glutamicus* ATCC No. 13032.

12. The process of claim 1 wherein the fermentation is conducted in the presence of an L-glutamic acid-producing bacteria belonging to the genera selected from the group consisting of Micrococcus, Brevibacterium, Microbacterium, Aerobacter, Corynebacterium, Bacillus, Escherichia, Pseudomonas, and Saccharomyces.

13. The process of claim 3 wherein the microorganism belongs to the genera selected from the group consisting of Micrococcus, Brevibacterium, Microbacterium, Aerobacter, Corynebacterium, Bacillus, Escherichia, Pseudomonas, and Saccharomyces.

References Cited

UNITED STATES PATENTS

| | | | |
|---|---|---|---|
| 3,002,889 | 10/1961 | Kinoshita et al. | 195—47 |
| 3,164,531 | 1/1965 | Okada et al. | 195—47 |

LIONEL M. SHAPIRO, *Primary Examiner.*

U.S. Cl. X.R.

195—29, 47, 114